United States Patent
Borean et al.

(10) Patent No.: US 8,982,857 B2
(45) Date of Patent: Mar. 17, 2015

(54) METHOD FOR MANAGING THE TRANSFER OF INFORMATION PACKETS ACROSS A WIRELESS AND ROUTING NODES IMPLEMENTING IT

(75) Inventors: Claudio Borean, Turin (IT); Roberta Giannantonio, Turin (IT); Sinem Coleri Ergen, Berkeley, CA (US)

(73) Assignees: Telecom Italia S.p.A., Milan (IT); Pirelli & C. S.p.A., Milan (IT)

( * ) Notice: Subject to any disclaimer, the term of this patent is extended or adjusted under 35 U.S.C. 154(b) by 642 days.

(21) Appl. No.: 12/451,837

(22) PCT Filed: Jun. 6, 2007

(86) PCT No.: PCT/EP2007/005048
§ 371 (c)(1),
(2), (4) Date: Apr. 15, 2010

(87) PCT Pub. No.: WO2008/148410
PCT Pub. Date: Dec. 11, 2008

(65) Prior Publication Data
US 2010/0202335 A1    Aug. 12, 2010

(51) Int. Cl.
*H04W 4/00*     (2009.01)
*H04W 52/02*    (2009.01)
*H04W 74/06*    (2009.01)
*H04W 84/18*    (2009.01)

(52) U.S. Cl.
CPC .............. *H04W 52/02* (2013.01); *H04W 74/06* (2013.01); *H04W 84/18* (2013.01)
USPC .......................................... 370/338

(58) Field of Classification Search
CPC ...... H04W 52/02; H04W 74/06; H04W 84/18
See application file for complete search history.

(56) References Cited

U.S. PATENT DOCUMENTS

| 5,987,011 | A  | * | 11/1999 | Toh ............................... 370/331 |
| 6,084,867 | A  | * | 7/2000  | Meier ............................ 370/338 |
| 6,580,704 | B1 | * | 6/2003  | Wellig et al. .................. 370/338 |
| 6,657,984 | B1 |   | 12/2003 | Semper |
| 7,020,501 | B1 |   | 3/2006  | Elliott et al. |

(Continued)

OTHER PUBLICATIONS

Buetter, M. et al., "X-MAC: A Short Preamble MAC Protocol for Duty-Cycled Wireless Sensor Networks," SenSys 2006, Boulder, Colorado, pp. 1-11, (Nov. 1-3, 2006).

(Continued)

*Primary Examiner* — Steven H Nguyen
(74) *Attorney, Agent, or Firm* — Finnegan, Henderson, Farabow, Garrett & Dunner, L.L.P.

(57) ABSTRACT

A wireless network includes permanently powered routing nodes and intermittently operating routing nodes. A polling procedure is used for transferring routing and data information packets from a permanently powered routing node to an intermittently operating routing node. In particular, when the permanently powered routing node has to transmit an information packet to the intermittently operating routing node, it stores the information packet in a memory; it waits until the intermittently operating routing node is able to receive information packets; and then it transmits the information packet to the intermittently operating routing node, and when the intermittently operating routing node has to transmit an information packet to the permanently powered routing node, it transmits immediately the information packet to the permanently powered routing node.

16 Claims, 8 Drawing Sheets

(56) References Cited

U.S. PATENT DOCUMENTS

| | | | |
|---|---|---|---|
| 7,035,240 B1 | 4/2006 | Balakrishnan et al. | |
| 7,251,235 B2* | 7/2007 | Wentink | 370/338 |
| 7,756,082 B1* | 7/2010 | Dhamdhere | 370/331 |
| 7,881,755 B1* | 2/2011 | Mishra et al. | 455/574 |
| 2003/0099221 A1* | 5/2003 | Rhee | 370/338 |
| 2003/0139151 A1 | 7/2003 | Lifshitz et al. | |
| 2003/0156558 A1* | 8/2003 | Cromer et al. | 370/331 |
| 2003/0231608 A1* | 12/2003 | Wentink | 370/338 |
| 2004/0125776 A1 | 7/2004 | Haugli et al. | |
| 2004/0153520 A1* | 8/2004 | Rune et al. | 709/206 |
| 2005/0009578 A1* | 1/2005 | Liu | 455/574 |
| 2005/0174962 A1* | 8/2005 | Gurevich | 370/328 |
| 2005/0180453 A1 | 8/2005 | Gaskill | |
| 2005/0185632 A1* | 8/2005 | Draves et al. | 370/351 |
| 2005/0220054 A1* | 10/2005 | Meier et al. | 370/331 |
| 2006/0039345 A1 | 2/2006 | Perez-Costa | |
| 2006/0056448 A1 | 3/2006 | Zaki et al. | |
| 2006/0215601 A1* | 9/2006 | Vleugels et al. | 370/328 |
| 2006/0218229 A1* | 9/2006 | Pandey et al. | 709/203 |
| 2007/0045424 A1* | 3/2007 | Wang | 235/462.46 |
| 2007/0069030 A1* | 3/2007 | Sauerwein et al. | 235/462.46 |
| 2007/0268867 A1* | 11/2007 | Wentink | 370/331 |
| 2008/0107076 A1* | 5/2008 | Ramachandran et al. | 370/331 |
| 2008/0112363 A1* | 5/2008 | Rahman et al. | 370/331 |
| 2008/0151814 A1* | 6/2008 | Jokela | 370/328 |
| 2008/0279130 A1* | 11/2008 | Lewis | 370/311 |
| 2009/0248829 A1* | 10/2009 | Habetha et al. | 709/208 |
| 2010/0188971 A1* | 7/2010 | Chiang | 370/225 |
| 2011/0286369 A1* | 11/2011 | Kosaka | 370/280 |

OTHER PUBLICATIONS

IEEE Standard, 802.15.4, "Part 15.4: Wireless Medium Access Control (MAC) and Physical Layer (PHY) Specifications for Low-Rate Wireless Personal Area Networks (NR-WPANs)," IEEE Computer Society, IEEE Std 802.15.4, pp. 105-110 and 155-156, (2003).

International Search Report from the European Patent Office for International Application No. PCT/EP2007/005048, mailed Apr. 24, 2008.

\* cited by examiner

METHOD FOR MANAGING THE TRANSFER OF INFORMATION PACKETS ACROSS A WIRELESS AND ROUTING NODES IMPLEMENTING IT

CROSS REFERENCE TO RELATED APPLICATION

This application is a national phase application based on PCT/EP2007/005048, filed Jun. 6, 2007, the content of which is incorporated herein by reference.

FIELD OF THE INVENTION

The present invention relates to a method for managing the transfer of information packets across a wireless network and routing nodes implementing it.

BACKGROUND OF THE INVENTION

WPAN [Wireless Personal Area Network] networks are known since some years; a PAN [Personal Area Network] network can be defined as a computer network for communicating among devices close to one person; a WPAN network is a PAN network using wireless short-range communication technologies.

A communication technology which is very often used for implementing a WPAN network is ZigBee.

One of the main and recent applications of WPAN networks is WSN [Wireless Sensor Network] networks.

In a WPAN the key components are the nodes of the network, also called devices; basically, there are two types of devices: FFD [Full Function Device] and RFD [Reduced Function Device]; usually, a WPAN network requires that at least one FFD device acts as a WPAN coordinator; FFD devices have the task to communicate with RFD devices and to route communication across the network; often FFD devices are mains powered while RFD are battery powered.

Depending on the application, a WPAN network may operate in different topologies: the star topology, the cluster tree topology and the mesh topology; WSN networks typically use the mesh topology; the present invention is particularly useful in this case.

In a traditional ZigBee network, there are three types of nodes, namely a ZigBee end device (which is often a RFD device) and a ZigBee coordinator (which is a FFD device) and a ZigBee router (which is a FFD device).

In a traditional WSN network based on the ZigBee technology, the end devices (also called "edge nodes") are battery powered and therefore are designed to limit power consumption while the routers and the coordinator (which is also a router) are mains supplied and therefore do not have problems with power consumption.

The component of a node of a WPAN network which is primarily responsible for power consumption is the radio transceiver; therefore, the typical way of reducing power consumption is to use "duty-cycling", i.e. to let the radio transceiver of the end devices operate intermittently for short period of times; of course, this complicates the communication protocols used in WPAN networks.

From the prior art, there are also known WSN networks wherein all the nodes are battery powered and therefore are designed to limit power consumption and wherein special MAC protocols are used to limit power consumption of the radio transceivers. For example, the article by M. Buetter et al, "X-MAC: A Short Preamble MAC Protocol for Duty-Cycled Wireless Sensor Networks", SenSys 2006, 1-3 Nov. 2006, Boulder, Colo., USA, describes in detail one of such MAC protocols called "X-MAC" and refers to others of such MAC protocols, namely "S-MAC", "T-MAC", "B-MAC" and "WiseMAC".

The problem of power consumption in wireless networks has already been considered in the past and solved through specific solutions.

From U.S. Pat. No. 7,035,240 there is known a method and network architecture for implementing an energy efficient network. The network includes a plurality of nodes that collect and transmit data that are ultimately routed to a base station. The network nodes form a set of clusters with a single node acting as a cluster-head. The cluster-head advertises for nodes to join its cluster, schedules the collection of data within a cluster, and then transmits the data to the base station. A cluster can intelligently combine data from individual nodes. After a period of operation, the clusters are reformed with a different set of nodes acting as cluster-heads. The network provides an increased system lifetime by balancing the energy use of individual nodes.

From U.S. Pat. No. 7,020,501 there is known a system for conserving energy in a multi-node network, in particular a sensor network; the network includes nodes configured to organize themselves into tiers; the nodes are further configured to produce a transmit/receive schedule at a first tier in the network and control the powering-on and powering-off of transmitters and receivers in nodes in a tier adjacent to the first tier according to the transmit/receive schedule. A number of monitor points connected to an external network are provided in communication with the sensor network.

Interoperability between different communication standards or between different releases of the same standard is in general a well known big issue and in the past it has been addressed and solved in many different ways depending on the particular case. The issue of compatibility may be at any of the different levels of the ISO/OSI stack.

A typical approach to the above problem is to provide one or more components of the network that support(s) both standards or both releases and to carry out a "translation". To this regard, the following US patents and US patent applications may be quoted: U.S. Pat. No. 6,657,984, 2003139151, 2005180453, 20060056448.

SUMMARY OF THE INVENTION

The Applicant has considered that, especially in WSN networks, it would be advantageous to let devices with low power consumption, typically battery supplied, act only or also as routers. This would require to have a routing node that operates intermittently or, more precisely, wherein its radio transceiver operates intermittently e.g. with a predetermined duty-cycle.

From the above consideration, the Applicant derived the need to have a traditional routing node, that has a permanently powered radio transceiver and typically a permanent operation, and an intermittent operation routing node effectively and efficiently communicate between them.

The first possibility considered by the Applicant was to properly re-design the communication protocols for the two types of routing nodes.

Anyway, this possibility was considered by the Applicant fairly disadvantageous as the communication protocol for a traditional (i.e. permanent operation) routing node is to large extent standardized and as many WPAN networks (including WSN networks) are already deployed. Therefore, the Applicant aimed at a solution wherein the communication protocol of the legacy network routing nodes are preserved; in other words, where the solution is backward compatible.

The two US patents previously mentioned, i.e. U.S. Pat. No. 7,020,501 and U.S. Pat. No. 7,035,240, do not deal with the problem of backward compatibility.

In particular, U.S. Pat. No. 7,035,240 completely neglects the problem of backward compatibility as all the nodes of the network run the same new algorithm, and in U.S. Pat. No. 7,020,501 no mention is made to routing nodes within the sensor network.

Therefore, the general technical problem behind the present invention is how to let intermittently operating routing nodes and permanently powered routing nodes communicate within a WPAN network.

More in particular, the present invention aims at finding a solution for letting an intermittently operating routing node and a permanently powered routing node communicate with no substantial change to the communication protocol used by the permanently powered routing node.

In order to solve the above mentioned problems, the Applicant has conceived to use a polling procedure for transferring information packets between the permanently powered routing nodes and the intermittently operating routing nodes.

In the case of some WPAN networks (e.g., a ZigBee network) a polling procedure is used by intermittently end nodes for communicating with permanently powered routing nodes. Accordingly, no change is required by the invention to the MAC protocol for the permanently powered routing nodes and for the end nodes connected thereto in these types of WPAN networks, and this leads to backward compatibility; some changes are however required at the network level.

More precisely, the polling procedure is used for receiving at an intermittently operating routing node (routing and data) information packets from a permanently powered routing node; specifically, when a permanently powered routing node has to transmit an information packet to a intermittently operating routing node it stores said information packet into a memory, it waits until said intermittently operating routing node is able to receive information packets and then it transmits said information packet to said intermittently operating routing node.

On the contrary, when said intermittently operating routing node has to transmit an information packet to said permanently powered routing node, it may transmit it immediately.

According to the present invention, the intermittently operating routing node may receive/transmit information packets from/to intermittently operating non-routing nodes through a duty-cycling communication protocol to be implemented preferably at the network level and not at the MAC level; this increases backward compatibility.

According to another aspect, the present invention also relates to a self-healing feature of the WPAN network which is provided thanks to the intermittently operating routing nodes of the network.

In fact, an intermittently operating routing node may be adapted to detect a loss in the radio connection with a permanently powered routing node and consequently notify all or a subset of the nodes of the network so that different routing of information packets may take place.

BRIEF DESCRIPTION OF THE DRAWINGS

The present invention will become more apparent from the following description to be considered in conjunction with the annexed drawing, wherein.

It is to be understood that the following description and the annexed drawings are not to be interpreted as limitations of the present invention but simply as exemplifications.

DETAILED DESCRIPTION OF THE INVENTION

The described embodiment of the present invention corresponds to a WSN [Wireless Sensor Network]. The wireless nodes of the network will be referred to as AOR [Always-On Router] nodes, SR [Sleeping Router] nodes, and ED [End Device] nodes; an AOR node is a node having routing facility and comprising a radio transceiver that is permanently operating (typically mains powered), a SR node is a node having routing facility and comprising a radio transceiver that is intermittently operating (typically battery powered), a ED node is a edge node having no routing facility and preferably comprising a radio transceiver that is intermittently operating (typically battery powered).

In the following description, the expression "information packets" covers both data information packets and routing information packets.

Hereafter, it is assumed that the reader is familiar with ZigBee and its communication technology and protocols as it is true per the persons skilled in the art.

Figure 1:
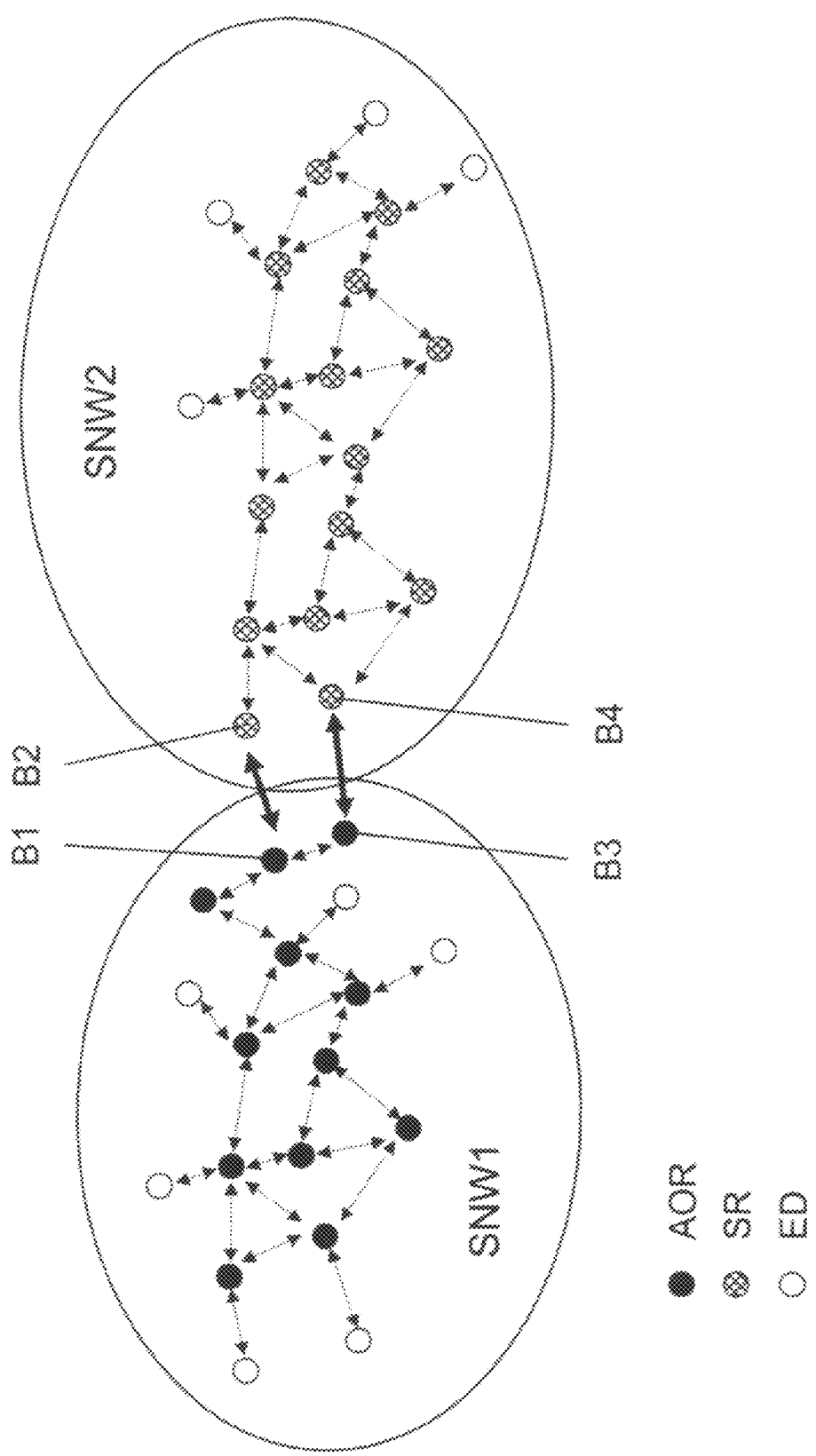
FIG. 1 shows schematically a WPAN network, specifically a WSN network based on ZigBee technology, according to the present invention.

In FIG. 1, there is shown a WPAN network, specifically a WSN network based on ZigBee technology, according to the present invention. This specific network comprises a first WSN sub-network SNW1 comprising a first plurality of nodes and a second WSN sub-network SNW2 comprising a second plurality of nodes.

The wireless nodes of the WSN network of FIG. 1 are of three different types: AOR nodes (black circles), SR nodes (crossed circles) and ED nodes (white circles); sub-network SNW1 comprises only AOR nodes and ED nodes while sub-network SNW2 comprises only SR nodes and ED nodes. Sub-network SNW1 is an almost-legacy WSN mains powered backbone network and could correspond to a network already deployed.

According to a common terminology, AOR nodes are FFD [Full Functional Devices] and are usually mains powered, ED nodes are usually RFD [Reduced Functional Devices] and battery powered, SR nodes are FFD [Full Functional Devices] and are usually battery powered.

In FIG. 1, lines with arrows represent the communication link between the nodes of the network; it has to be noted that all the lines have two arrows which means a bidirectional communication.

The two sub-networks are connected and communicate by means of four "bridge" routing nodes B1, B2, B3, B4: two AOR nodes B1 and B3 and two SR nodes B2 and B4; this will be better explained in the following as it corresponds to one of the key aspects of the present invention.

It has to be considered that the power consumption is seriously affected by the radio transceiver of a node, in particular by the active period both in reception and in transmission phase as for many commercial transceivers (e.g. Texas Instruments CC2420/CC2430, Ember EM250, etc.) power consumption is quite the same. For this reason, when a node needs to keep his radio transceiver always active it needs to be powered either by the mains or by a very powerful (and bulky) battery.

When a wireless node having a radio transceiver is powered by a (small) battery a common approach to reduce power consumption and maximise the battery life is "duty-cycling"; in other terms, its transceiver is active only periodically for a short period of time.

This approach creates no problem to transmission by the node; in fact, transmission may occur periodically only when the node wakes up. Anyway, in order to allow reception by the node (without loosing information) there is a need to use specific methods to manage the transfer of information packets with other nodes.

In FIG. 1, there are three different communication protocols:

the first communication protocol is according to the ZigBee technology used within sub-network SNW1 for communication between any ED node of sub-network SNW1 and any AOR node and for communication between AOR nodes;

the second communication protocol is a duty-cycling communication protocol used within sub-network SNW2 for communication between intermittent operation nodes, specifically between any ED node of sub-network SNW2 and any SR node and between SR nodes;

the third communication protocol is used by the four "bridge" nodes B1, B2, B3, B4 for communicating together, in particular for an AOR node (i.e. a permanent operation routing node) for communicating with a SR node (an intermittent operation routing node);

the second and especially the third communication protocols are aspects of the present invention.

Sub-network SNW1 can find multiple accesses to sub-network SNW2 by means of its routing nodes, i.e. SR nodes; in FIG. 1, only two pairs of SR node+AOR node, i.e. B2+B1 and B4+B3, act as gateway which is the minimum according to the present invention; a higher number of pair could be established and used for communication between the two sub-networks.

Figure 2:
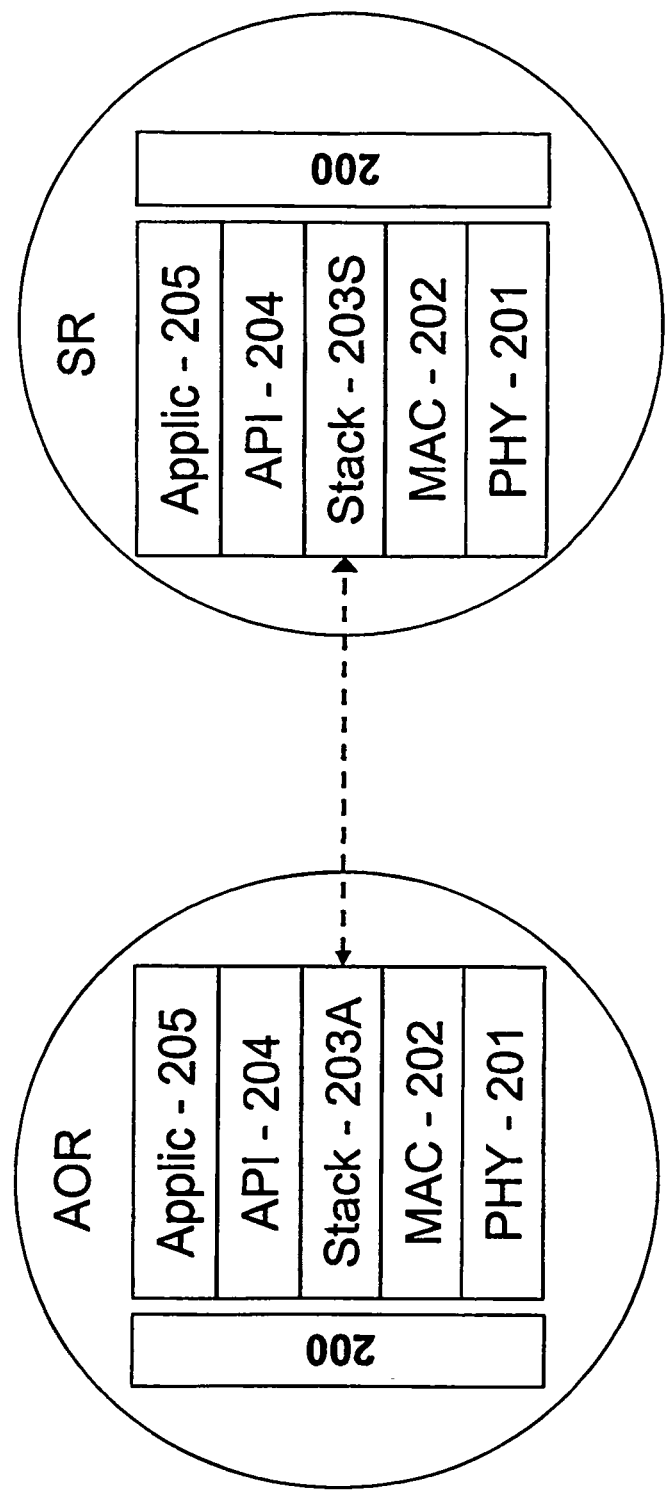
FIG. 2 shows schematically the protocol stack of the two kinds of nodes, i.e. an AOR node and a SR node.

The nodes in the two sub-networks have a different protocol stack, because the main objective of sub-network SNW1 (which is mains powered) is minimize the latency (typical requirement of e.g. a control network) while the main objective of sub-network SNW2 (which is battery powered) is to maximise battery life (typical requirement of e.g. a monitoring network for sensing data). In FIG. 2, the protocol stack of the two kinds of nodes (i.e. AOR and SR) is described; the nodes comprise the following layers, according to a ISO/OSI standard approach:

PHY layer 201 and MAC layer 202: the PHY layer 201 may be implemented in hardware (transceiver) and allow the node to scan the energy of the network and send packets over the air; the MAC layer 202 controls and manages the access to the channel that could be e.g. CSMA/CA [Carrier Sense Multiple Access with Collision Avoidance];

STACK layer 203: it represents the network stack of the nodes: it can be oriented to guarantee the low power feature of the network (SR stack 203S) or the low latency feature within the network (AOR stack 203A);

API layer 204: this is the interface of the application to the lower layers and allows to run specific application on top of the nodes; the set of APIs typically defined by this layer includes send/receive data interfaces and application addressing mechanism (usage of application resources); this layer can be represented by e.g. the application sub-layer defined as "APS" in the ZigBee technology;

APPLICATION layer 205: this is the top layer of the node architecture and corresponds to the application that performs the control functions in the network; in a general case, a single node can run multiple applications that access to the resources through the API layer; in a ZigBee embodiment of the present invention, the application can be compliant to a specific ZigBee application profile like Building automation, Wireless Sensor Application, Home Automation, etc.

The above mentioned layers are managed by a cross layer management block 200 that controls the performances of the node.

The edge nodes ED in sub-network SNW1 have a stack suitable for communication with a parent AOR node, while edge nodes ED in sub-network SNW2 have a stack suitable for communication with a parent SR node.

The communication between an AOR node and a SR node makes use of a polling procedure; this applies to both data and routing information packets. In particular, when an AOR node has to transmit an information packet to a SR node, it stores said information packet into a memory, it waits until said SR node is able to receive information packets and then it transmits said information packet to said SR node, while when said SR node has to transmit an information packet to said AOR node it transmits immediately said information packet to said AOR node.

To this purpose the AOR node comprises a memory for storing information packets to be sent to the SR node and a module for waiting until the SR node is able to receive information packets and for transmitting the information packets to the SR node.

The SR node comprises a polling module implementing a polling procedure for receiving such information packets from the AOR node, a duty-cycling communication module implementing a protocol for communicating with other SR or ED nodes, and a module for monitoring the radio connection with the AOR node and for determining whether such radio connection is lost.

The above mentioned modules may implemented as software, firmware or even hardware modules.

The communication between SR nodes or between a SR and an ED node is a "low power communication protocol" and may be based on either of two different approaches: "synchronization" and "sniffing". These approaches has already been used in MAC protocols implemented in WSN networks wherein all the nodes are battery powered. The article by M. Buetter et al, "X-MAC: A Short Preamble MAC Protocol for Duty-Cycled Wireless Sensor Networks", SenSys 2006, 1-3 Nov. 2006, Boulder, Colo., USA, describes in detail one of such MAC protocols called "X-MAC" and refers to others of such MAC protocols, namely "S-MAC", "T-MAC", "B-MAC" and "WiseMAC".

According to the present invention, in particular, theses approaches are implemented at the STACK layer; in this way, the physical and MAC layer may be advantageously left unchanged so that to provide backward compatibility with already deployed e.g. ZigBee networks.

In the following a more detailed description of the communication between an AOR node and a SR node will be provided in conjunction with FIG. 3, FIG. 4 and FIG. 5.

Figure 3:
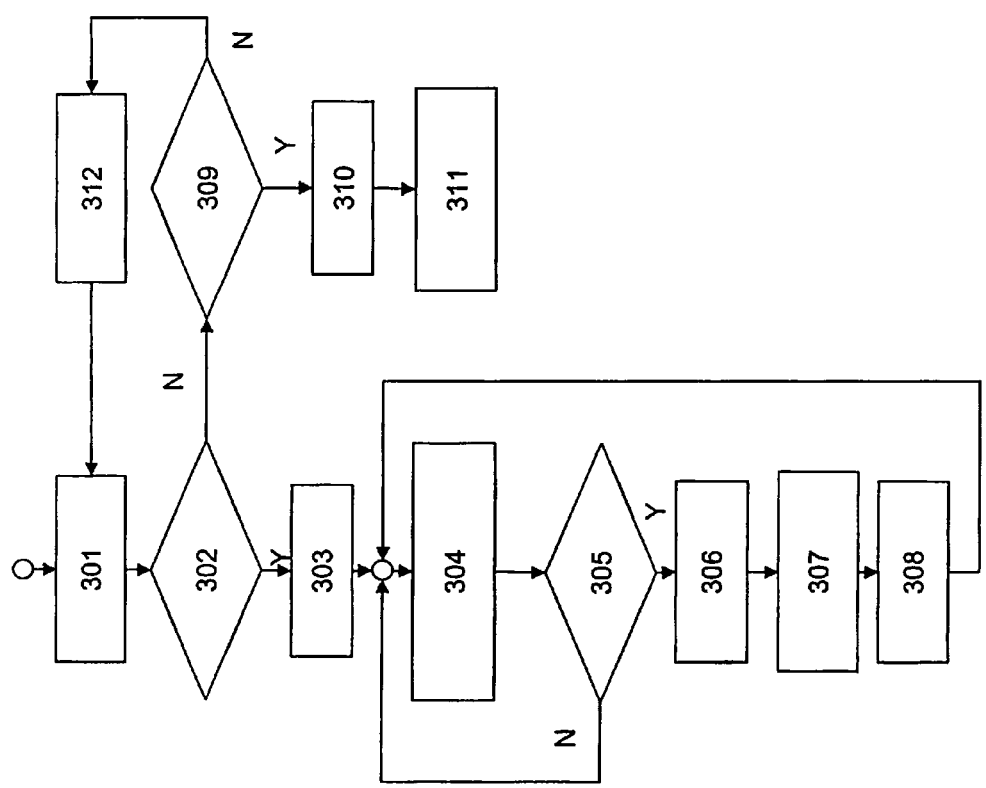
FIG. 3 shows schematically a flowchart relating to the initialization of a SR node.
Figure 4:
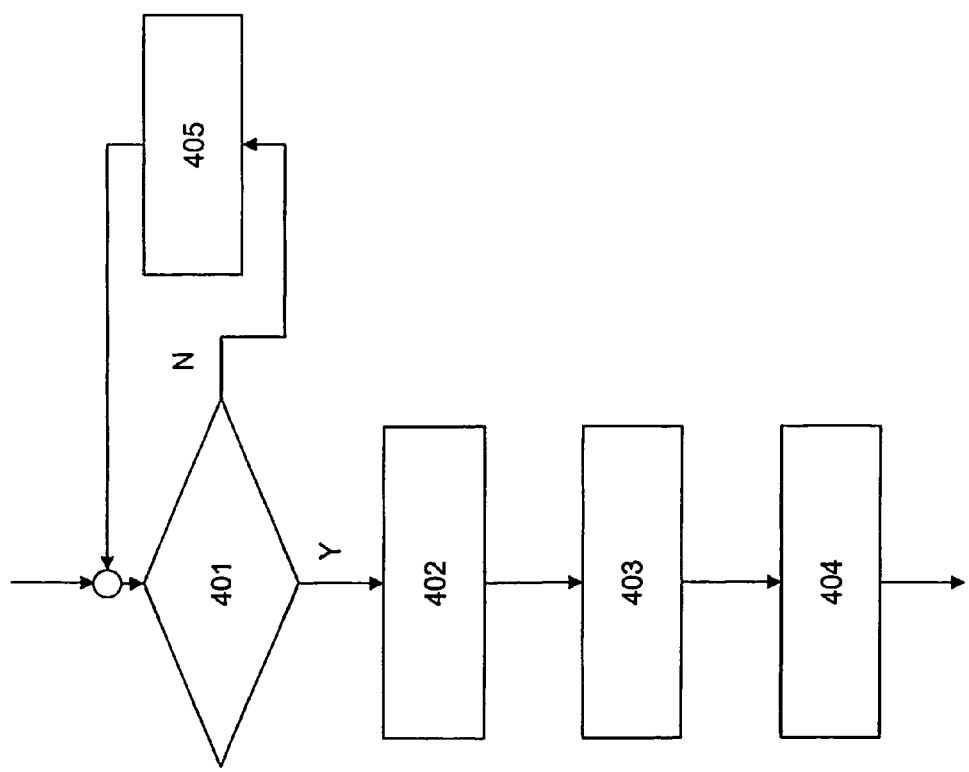
FIG. 4 shows schematically a flowchart relating to the indirect communication between a SR node and an AOR node.

FIG. 3 relates to the initialization of a SR node.

The SR node wakes up and search for any existing network (step 301). If the SR node finds an AOR node (step 302), it joins it by issuing a joining procedure (step 303) and becoming its "son". If no AOR node is within the coverage area of the SR node (step 302) a "low power communication protocol" (such as "low power listening") will be used first for association and then for communication; if the SR node finds another SR node (step 309) within its coverage area available for becoming its "parent", it joins it (step 310) and then, according to this protocol, a low power communication phase (step 311) with the other SR node follows; if the SR node does not find another SR node within its coverage area available for becoming its "parent", an "association failed" situation occurs (step 312) and a new attempt will be tried later (step 301).

When an SR node associates to another node (either an AOR node or a SR node), it specifies to the "parent" node that its transceiver will be intermittently operating. This is particularly important when an SR node associates to an AOR node; in fact, in this case, the AOR node needs to be aware that it has to communicate with a non-permanently powered routing node and therefore it has to transmit both routing information packets directed to this node and data information packets directed to other nodes as well as, if the case, data information packets directed to this node storing this data and waiting for a polling phase.

In order to receive data from the AOR node which the SR node has associated with, an indirect transmission mechanism shall be implemented both in the AOR node and in the SR node (step 304).

In order to transmit data to the AOR node which the SR node has associated with, first of all a check (step 305) is made whether there are packets to be transmitted; if so, the transceiver of the SR node is activated (step 306), then immediately after a direct transmission of the information packet is carried out (step 307), and finally the transceiver of the SR node is deactivated (step 308). This is possible as the AOR node and its transceiver is permanently operating. FIG. 4 relates to the indirect communication (step 304) between the SR node and the AOR node.

The sleeping SR node will activate its transceiver (step 402) before a polling procedure; then it will poll the AOR note (step 403) for data every e.g. "MaxWaitTime", i.e. a time period parameter to be set; the polling period of the polling procedure is implemented through a waiting loop comprising a counter check step (step 401) and a counter increment step (step 405); finally, the sleeping SR node will return to sleep by deactivating its transceiver (step 404) so preserving its battery life. This happens even if the SR node is placed at the border of the network, contiguous to powered backbone branch of the WSN network (i.e. sub-network SNW1), and if the SR node is associated to an AOR node.

Figure 5:
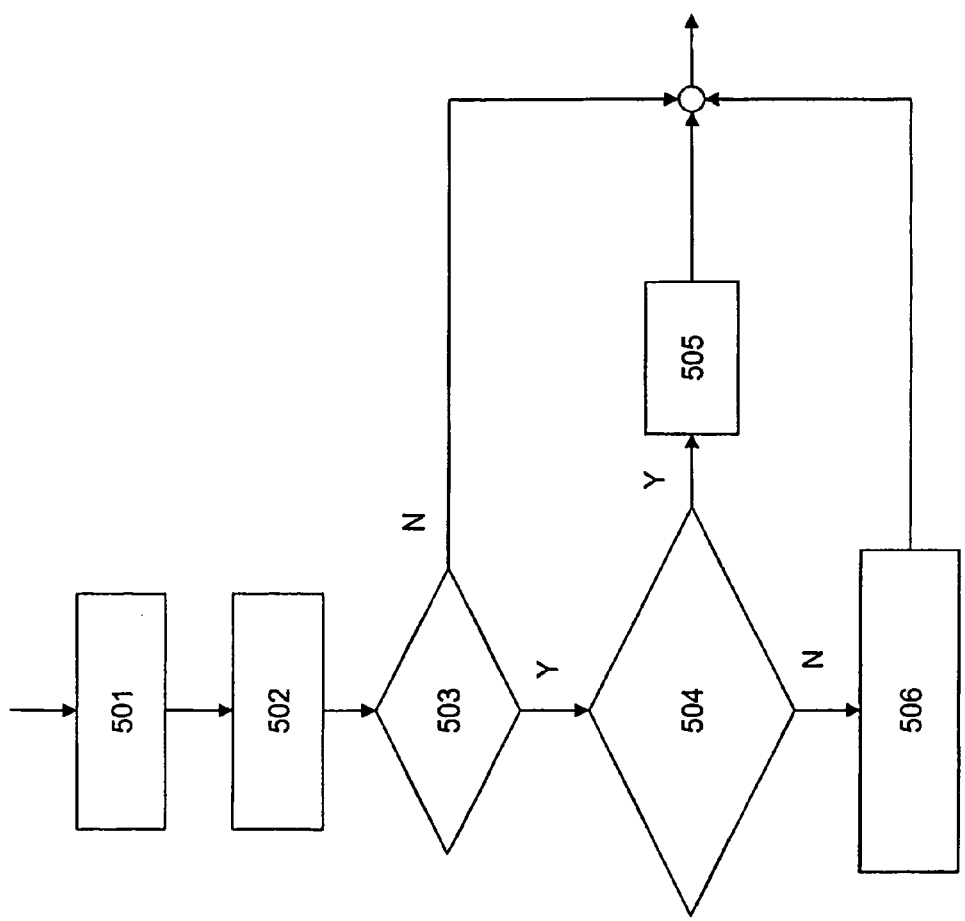
FIG. 5 shows schematically a flowchart relating to the polling phase carried out by a SR node.

FIG. 5 relates to the polling phase (step 403) carried out by the SR node.

The SR node will transmit a request of data to the parent AOR node (step 501) and will receive a reply from the AOR node (step 502); to this regard a piggy-backing mechanism like acknowledgement with "pending data" flag set may be implemented. The reply will be checked (step 503): if the AOR node has no information packet pending for the SR node no further steps will be carried out; otherwise, a waiting loop (step 504) will be carried out which ends either when the AOR node starts transmission of the information packet or when a timeout of e.g. "DataMaxWaitTime", i.e. a time period parameter to be set, expires. If the timeout is reached the SR node will notify a "failure in reception" (step 505) and might retry the reception process later; otherwise the SR node will receive the information packet from the AOR node (step 506).

According to the embodiment of the invention of FIG. 1, the WSN network is implemented through a ZigBee network, more precisely the connection of two ZigBee sub-networks SNW1 and SNW2.

In order to maintain interoperability between the two sub-networks, the MAC and PHY layers of the nodes of the two sub-networks are both compatible with the ZigBee technology.

Additionally, no substantial change is applied to the communication protocol of the mains powered routing nodes of sub-network SNW1, i.e. AOR nodes. In order to achieve this objective, the gateway AOR nodes (B1 and B3 in FIG. 1) use a polling procedure for communicating not only with any ED nodes but also with SR nodes (B2 and B4 in FIG. 1) associated thereto; to this regard, reference is made to IEEE 802.15.4-2003 paragraph 7.1.16 and FIG. 33 as well as paragraph 7.5.6.3.

Once the gateway SR (B2 and B4 in FIG. 1) nodes have associated to corresponding AOR nodes (B1 and B3 in FIG. 1), AOR nodes should forward broadcast and multicast routing information packets to SR nodes in order to enable routing protocols to propagate from (mains powered) sub-network SNW1 to (battery powered) sub-network SNW2. This is easily performed because during the association phase, SR nodes declare as a node with routing features but with the feature to put the transceiver in a sleeping mode when in idle status (which is not true for AOR nodes). On the other hand, an AOR node recognizes nodes with routing capability and the ability of putting the transceiver in a sleeping mode when in idle status, i.e. an SR node, and are able to store all the information packets for them: these packets can be data packets addressed to the SR node itself as well as broadcast or multicast routing packets and data packets addressed to a node to which the SR node has a route. In other words, while an AOR node in order to manage the communication with an ED node has to store only the data packets addressed to it, in order to manage the communication with a SR node has to store also packets having that SR node as next hop and all broadcast and multicast packets (e.g. network command packets). In this way, interoperability among sleeping routers and always-on routers can be effectively performed.

Additionally, thanks to the possible multiple connection between SR nodes, single point of failure for the system is avoided with regard to the connection between sub-network SNW1 and sub-network SNW2.

The polling mechanism known and used according to the ZigBee technology, allows an SR node to poll data only from its "parent" node since the corresponding polling primitive does not allow to specify the destination of the polling. In this way, even if more than one AOR node is in the radio range of a SR node, only one link (AOR-SR) will be used for the communication from an AOR node to an SR node. Furthermore, the communication from the SR node to any neighbouring AOR node will be done using only the parent link. In fact, even if a direct message could be issued from an SR node to an AOR node, like a ZigBee Route request message, the Route Reply will follow the reverse path and so the next hop will be set to the parent node as a result of the route request itself; this is performed letting the SR node reply to a request for a route only from its neighbouring SR nodes and from its parent AOR node, if present.

This mechanism in the communication is one of the main strength of the present invention because it allows using the existing polling mechanism without any substantial change to the protocol stack.

It is to be clarified that AOR nodes should keep data packets for SR nodes long enough to permit them to wake up and poll for this data: to this propose, the existing network layer variable has to be set using the same procedure used for AOR-ED communication.

In other words, the introduced feature allows low power routers to sleep saving energy and to be battery operated thus removing the constraint of having the router always mains powered.

Figure 6:
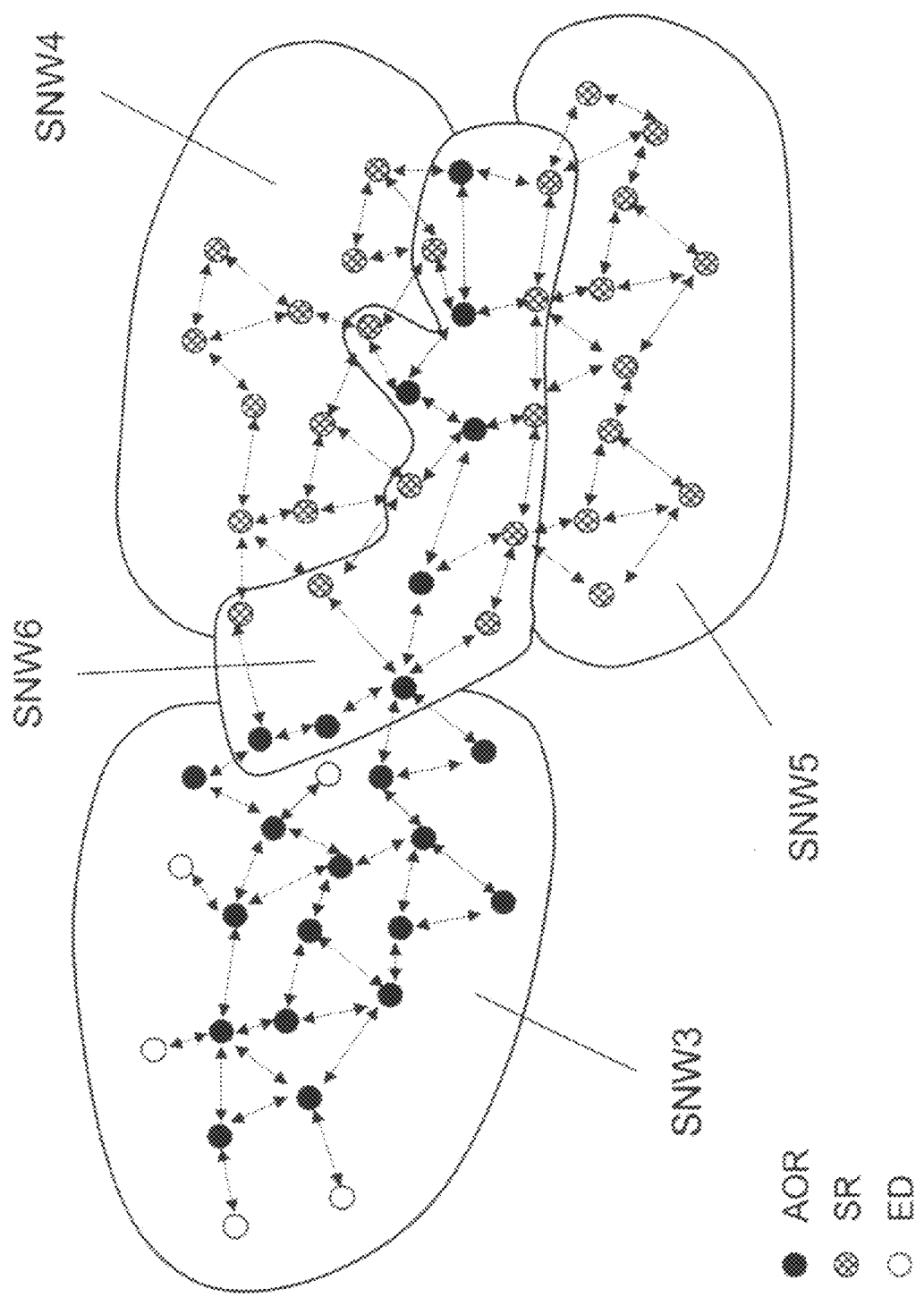
FIG. 6 shows schematically a general distributed interoperability WPAN network scenario.

In FIG. 6 a distributed interoperability network scenario is described which is a more general case than the example of FIG. 1; three sub-networks SNW3 (e.g. an AOR branch), SNW4 (e.g. a first SR branch) and SNW5 (a second SR branch) are highlighted and a border area SNW6 between them is also highlighted: by allowing association to multiple SR nodes, an AOR node on the borders of a sub-network can establish multiple paths to connect the SR branches of the network (see the AOR nodes of SNW6 area in FIG. 6). In this way, communication with SR nodes can be maintained even if a failure occurs at one specific connection link between the always-on and sleeping nodes. When a battery failure occurs, other SR-AOR links can anyway maintain the communication by redirecting the traffic of the overall network and restoring the load balance.

In order to guarantee the communication between mains-powered and battery powered sub-networks, the present invention foresees for example a procedure (FIG. 7) by which the SR nodes should notify to the rest of the network if a problem in the link to an AOR router occurs by issuing broadcast packets but preferably multicast packets to other nodes in border positions; if no location function is provided, the broadcast packets are used.

In this case, likely due to a shift of a parent AOR node (e.g. for slow mobility applications), the other nodes, not yet connected to an AOR node, (they may check their parent list to do this operation) will try to associate to an AOR node, improving network reliability by maximizing the connection to the mains-powered sub-network, and will notify their associated nodes (typically other SR nodes) if a change in their own address will occur. In this case, the associated SR nodes will be forced to rejoin the network in order to restore the optimal balance in the low power sub-network structure.

More specifically, whenever a SR node that is connected to an AOR node (through a child-parent link) looses the connection with its AOR parent (i.e. due to SR nodes mobility, battery failure or discharge, etc.) it sends a notify packet to let other SR nodes know about the problem. This packet could be sent via multicast or broadcast communication. Whenever an SR receives this "connection loss" message, it checks its parent node's type: if it is not a AOR node (i.e. it is an SR node) it will check if there is a AOR in its radio range and, if present, it will try to associate with it. In this way the connection link between the SR net and the AOR net is guaranteed. If the parent's change occurs and the SR node's address is changed, the SR node will have to notify this change to all the nodes associated to itself; in this way, all the associated SR nodes will rejoin the network to get updated addresses and all the routing tables will be updated to reflect the new addresses.

This procedure may solve the portability problem; SR nodes will be battery powered and therefore they will be able to move and change position during their operation time. For this reason, it is very useful to have a procedure to enable the mobility and guarantee the connection with the AOR network.

Figure 7:
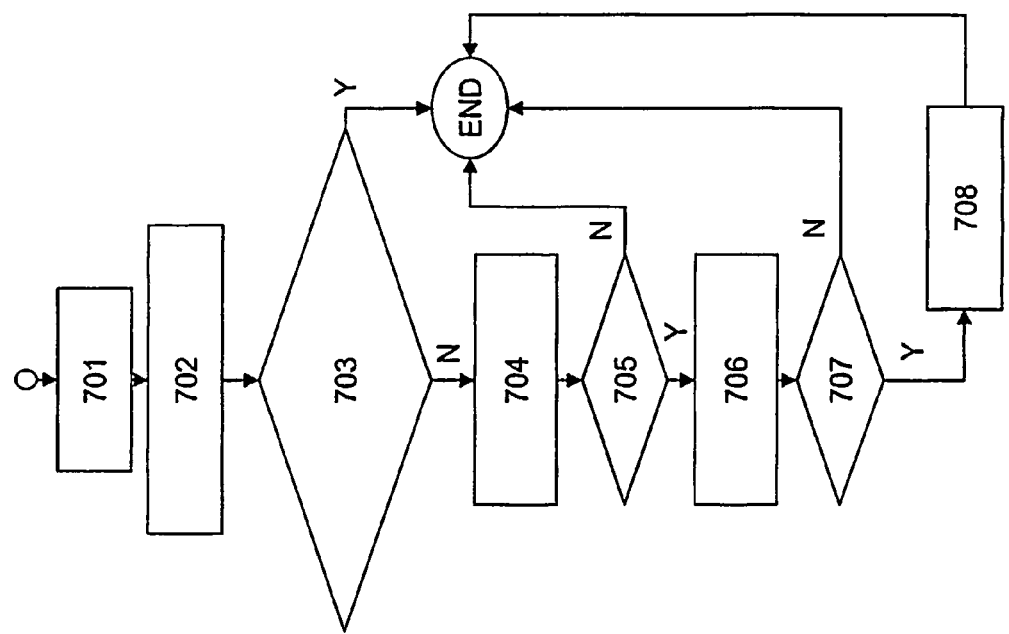
FIG. 7 shows schematically a flowchart relating to a self-healing method according to the present invention.

The self-healing method according to the present invention will be described in the following with reference to the example flow-chart of FIG. 7.

At step 701, a SR node detects a loss in the connection with its parent AOR node; at step 702, the SR node notifies the network (through a broadcast or a multicast transmission) of the detected loss of connection. A number of SR nodes will receive the loss of connection notification and each of them checks, at step 703, whether it is already connected to an AOR node or not; if this is the case, no further steps are carried out by the SR node; otherwise, at step 704, each SR node will carry out a radio scan for identifying an AOR node that can act as its parent node. At step 705, each SR node will check whether a new parent has been identified; if not, no further steps are carried out by the SR node; otherwise, at step 706, the SR node will associate to the new parent. Thereafter, at step 707, the SR node checks whether its network address is changed due to the new association; if not, no further steps are carried out by the SR node; otherwise, at step 708, the SR node will notify all the interested nodes of the network of its new address and typically at least the nodes associated to it.

The proposed method for interoperability allows relying on sleeping routers for fault tolerance. In the situation shown in FIG. 8 where a portion P2 of the AOR sub-network is no more connected to another portion P1 of the AOR sub-network (due, for instance, to a strong radio interference present in the area A delimited by the continuous line) the ad-hoc communication among AOR can rely on the connection carried out by a SR sub-network SNW7.

Figure 8:
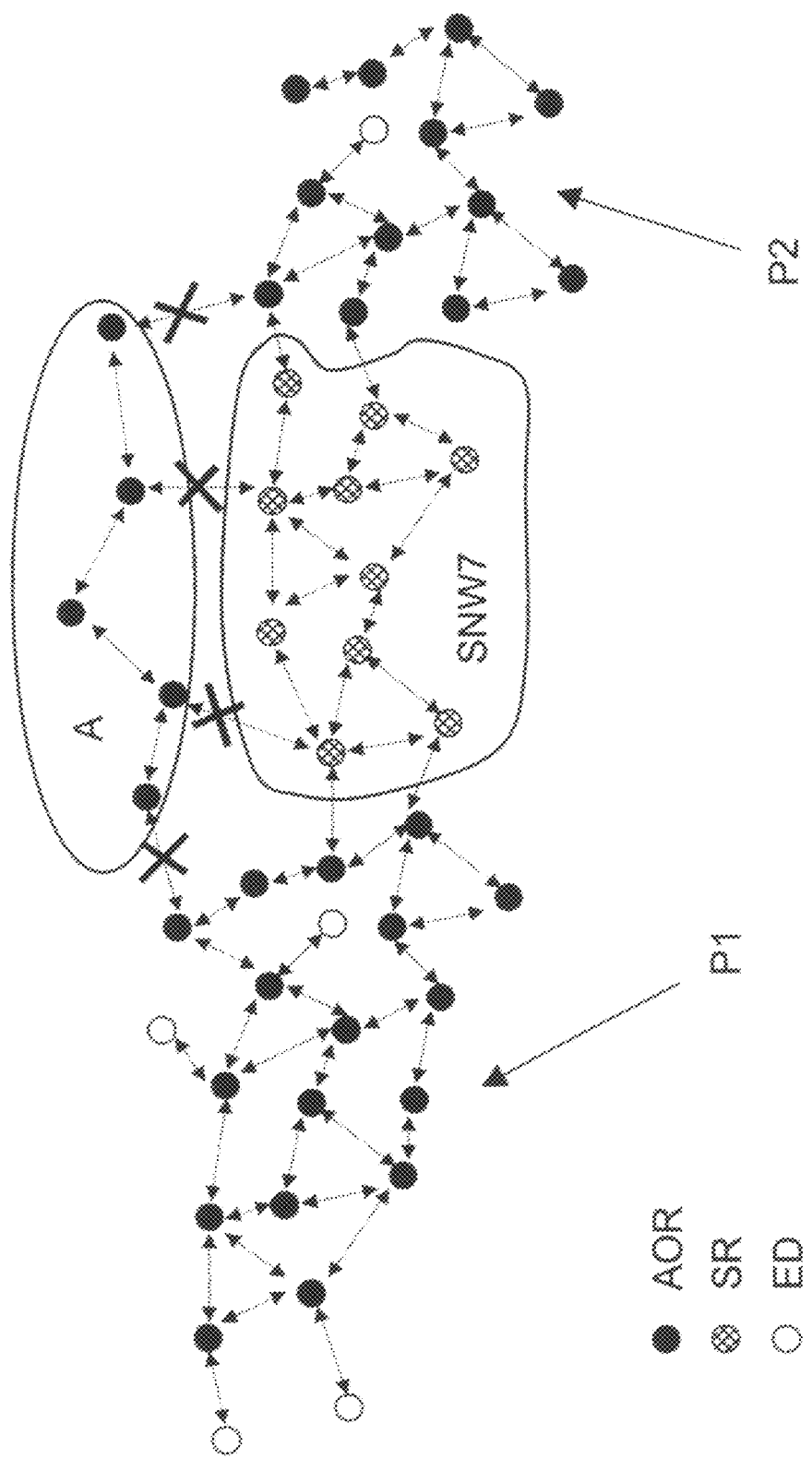
FIG. 8 shows schematically an application of a self-healing method according to the present invention to a specific WPAN network.

Thinking of an AOR network (divided into two portions or sub-networks P1 and P2) already deployed and an SR network SNW7 joining after, this SR network SNW7 can be situated, as in FIG. 8, in the middle of the two existing AOR sub-networks P1 and P2: in this situation, using the joining procedure described above and assuming that at least some of the AOR nodes still permit association, the border SR nodes will join directly the AOR nodes in their radio range. In this way, the connectivity between two AOR sub-networks can be achieved even in presence of a global failure in the direct connection between the two sub-networks.

Using the described polling mechanism the SR network will carry out a connectivity function within the WPAN network thus providing a new route to better connect AOR nodes and delivering packets to the otherwise disconnected branches of the WPAN network. The new route will be established thanks to the broadcast/multicast of routing packets that will allow SR nodes to poll for route request packets from its parent nodes, including parent AOR nodes.

Anyway, according to the present invention, it is preferred to re-establish a lost connectivity through other AOR nodes than through SR nodes; in fact, the connection through AOR nodes is quicker due to a direct communication between always-on nodes.

It is worth highlighting that the above description of the present invention deals with a WPAN network, in particular a ZigBee network, comprising a plurality of permanently powered routing nodes and a plurality of intermittently operating routing nodes as well as a plurality of end nodes and a method for managing the transfer of information packets across such WPAN network.

Anyway, the present invention has an impact also to the routing nodes of the WPAN network both the permanently powered ones and the intermittently operating ones; these are further aspects of the present invention.

The invention claimed is:

1. A method for managing the transfer of information packets across a wireless network comprising a first plurality of permanently powered routing nodes forming a first permanently powered sub-network, a second plurality of permanently powered routing nodes forming a second permanently powered sub-network, and a plurality of intermittently operating routing nodes forming an intermittently operating sub-network, comprising:

associating the first permanently powered sub-network directly with the second permanently powered sub-network;

if the first permanently powered sub-network loses connection with the second permanently powered sub-network, associating the intermittently operating sub-network with each of the first permanently powered sub-network and the second permanently powered sub-network;

transferring information packets, comprising routing information packets and data information packets, from at least one of the first plurality of permanently powered routing nodes to at least a first intermittently operating routing node of said plurality of intermittently operating routing nodes, using a polling procedure; and transferring information packets, comprising routing information packets and data information packets, from at least one of the second plurality of permanently powered routing nodes to at least a second intermittently operating routing node of said plurality of intermittently operating routing nodes, using a polling procedure, wherein the polling procedure comprises transmitting a request of data from one intermittently operating routing node to one permanently powered operating routing node, receiving a reply from the permanently powered operating routing node, checking the reply, and if the permanently powered routing node has an information packet pending for the intermittently operating routing node, carrying out a waiting loop which ends either when the permanently powered routing node starts transmission of the information packet or when a predetermined time period expires.

2. The method according to claim 1, wherein transferring information packets comprises attempting to immediately transmit said information packet.

3. The method according to claim 1, wherein said at least one of the first plurality of permanently powered routing nodes transmits information packets to only one of said plurality of intermittently operating routing nodes.

4. The method according to claim 1, wherein said first intermittently operating routing node receives information packets from only one of the first plurality of permanently powered routing nodes of said wireless network.

5. The method according to claim 1, wherein transferring information packets comprises said first intermittently operating routing node receiving information packets from other intermittently operating routing nodes of said wireless network, or transmitting information packets to other intermittently operating routing nodes of said plurality of intermittently operating routing nodes, through a duty-cycling communication protocol.

6. The method according to claim 1, wherein said first intermittently operating routing node is associated with only one permanently powered routing node of said wireless network, and wherein, if said first intermittently operating routing node loses radio connection with said only one permanently powered node, said intermittently operating routing node associates with another available permanently powered routing node of said wireless network.

7. The method according to claim 1, wherein, if said first intermittently operating routing node associates with another permanently powered routing node of said wireless network, routing information within at least a subset of the routing nodes of said wireless network are consequently updated.

8. The method according to claim 1, wherein said wireless network is a ZigBee network.

9. The method according to claim 1, wherein the intermittent operation of the intermittently operating routing nodes of said wireless network is related to a transceiver thereof.

10. A network of routing nodes comprising a first plurality and second plurality of always-on routing nodes for a wireless network, the first and second pluralities of always-on routing nodes forming first and second always-on sub-networks, respectively, the first and second sub-networks connected to each other, each always-on routing node comprising a radio transceiver having a permanent power supply and configured to communicate with a plurality of intermittently operating routing nodes, each comprising a radio transceiver having an intermittent operation, wherein, in the case of a lost connection between the first and second always-on sub-networks, at least one of the first plurality of always-on routing nodes communicates with at least one of the plurality of intermittently operating nodes, and wherein the always-on routing node comprises:

a memory configured to store at least an information packet to be sent to the at least one intermittently operating routing node, said information packet comprising routing information packets and data information packets; and a module configured to receive a request of data from at least one intermittently operating node, reply to the intermittently operating node, and carry out a waiting loop that ends either when the transmission of the information packet begins or when a predetermined time period expires.

11. The network of routing nodes of claim 10, wherein said module is configured to determine and store the type of operation of a transceiver of another routing node when said other routing node associates with said transceiver of another routing node, said type of operation of the transceiver being permanent or intermittent.

12. A wireless network of routing nodes comprising a first plurality of permanently powered routing nodes forming a first permanently powered sub-network, a second plurality of permanently powered routing nodes forming a second permanently powered sub-network, and a plurality of intermittently operating routing nodes forming an intermittently operating sub-network, wherein the first permanently powered sub-network is wirelessly connected to the second permanently powered sub-network, and wherein each of said plurality of intermittently operating routing nodes comprises a polling module implementing a polling procedure for receiving, from one of said permanently powered routing nodes, information packets directed to any of said plurality of intermittently operating routing nodes, said information packets comprising routing information packets and data information packets, wherein each intermittently operating routing node is configured to receive a notification notifying of a loss of connection between the first and second permanently powered sub-networks, and wherein, upon receiving said notification, at least one intermittently operating routing node is configured to search for and connect to a permanently powered routing node using a polling procedure, wherein the polling procedure comprises transmitting a request of data from one intermittently operating routing node to one permanently powered operating routing node, receiving a reply from the permanently powered operating routing node, checking the reply, and if the permanently powered routing node has an information packet pending for the intermittently operating routing note, carrying out a waiting loop which ends either when the permanently powered routing note starts transmission of the information packet or when a predetermined time period expires.

13. The network according to claim 12, comprising a duty-cycling module configured to implement a duty-cycling communication protocol for communicating with other intermittently operating nodes of said wireless network.

14. The network according to claim 12, configured to associate, in the case of a loss of connection between the first and second permanently powered sub-networks, at least one permanently powered routing node with only one intermittently operating routing node.

15. The network according to claim 12, comprising a module configured to monitor a radio connection between the first and second permanently powered sub-networks to determine whether said radio connection is lost.

16. The network according to claim 15, wherein, when said radio connection is lost, said module sends said notification message.

* * * * *